United States Patent [19]
Hommerin

[11] 3,879,030
[45] Apr. 22, 1975

[54] AUTOMATIC FILM TRANSFER DEVICE FOR MAGAZINES CONTAINING FILM IN SHEETS

[75] Inventor: Michel Hommerin, Paris, France

[73] Assignee: Compagnie Generale de Radiologie, Paris, France

[22] Filed: Oct. 2, 1973

[21] Appl. No.: 402,807

[30] Foreign Application Priority Data
Oct. 6, 1972 France .............................. 72.35492

[52] U.S. Cl. ................ 271/8 R; 271/225; 271/269; 354/319
[51] Int. Cl. .............................................. B65h 5/16
[58] Field of Search ............ 271/10, 11, 12, 13, 14, 271/15, 16, 17, 4, 225, 3, 54, 8 R, 269; 95/13, 14, 89; 354/319

[56] References Cited
UNITED STATES PATENTS

| | | | |
|---|---|---|---|
| 2,880,994 | 4/1959 | Last | 271/10 |
| 3,276,769 | 10/1966 | Kallenberg | 271/10 |
| 3,396,964 | 8/1968 | Fengler et al. | 271/11 X |

*Primary Examiner*—James B. Marbert
*Assistant Examiner*—Bruce H. Stoner, Jr.
*Attorney, Agent, or Firm*—Cushman, Darby & Cushman

[57] ABSTRACT

A light-proof transfer device makes it possible to introduce into a developer apparatus, exposed film sheets or negatives which are coiled up in a magazine. Introduction is effected automatically despite the residual curvature in the negatives issuing from the magazine.

The device includes a light-tight box-shaped housing which receives the negatives on exit from the magazine, the housing containing means for pushing the negative ejected from the magazine laterally into an output slot preceded by a deflector designed to flatten out the negative which is introduced into the developer apparatus through an input slot registering with the output slot of the device, in a direction perpendicular to its own curvature.

7 Claims, 6 Drawing Figures

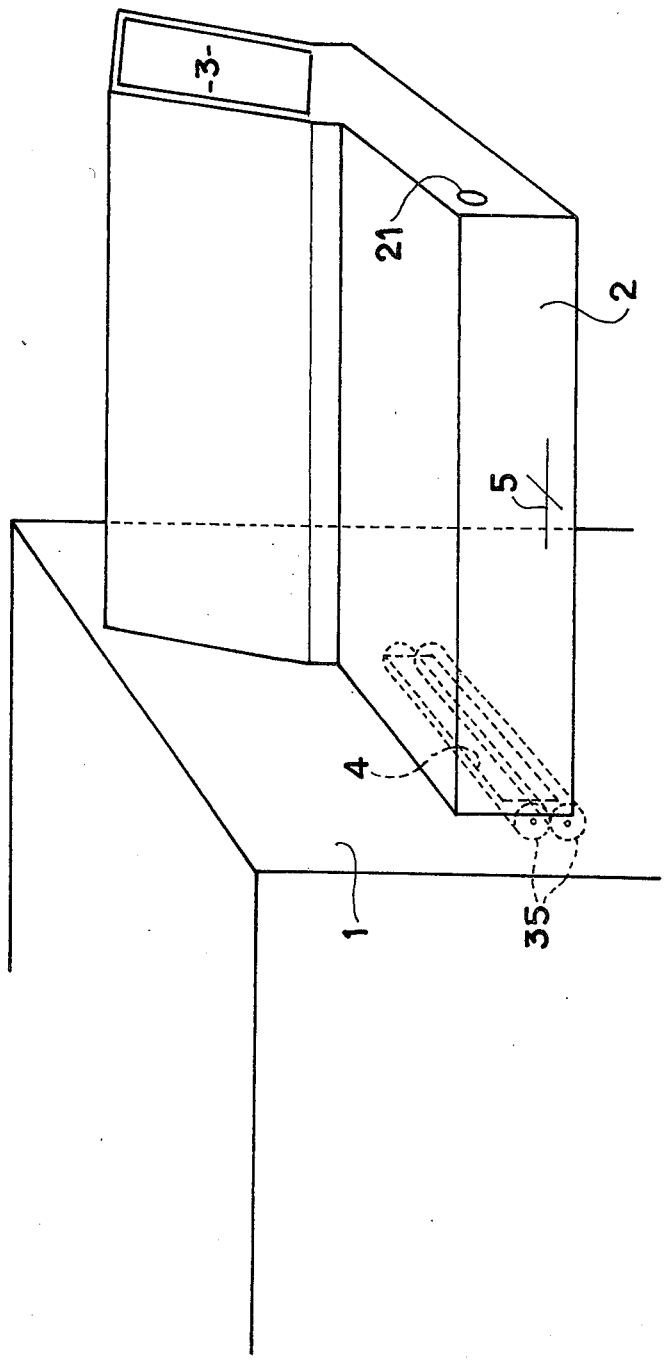

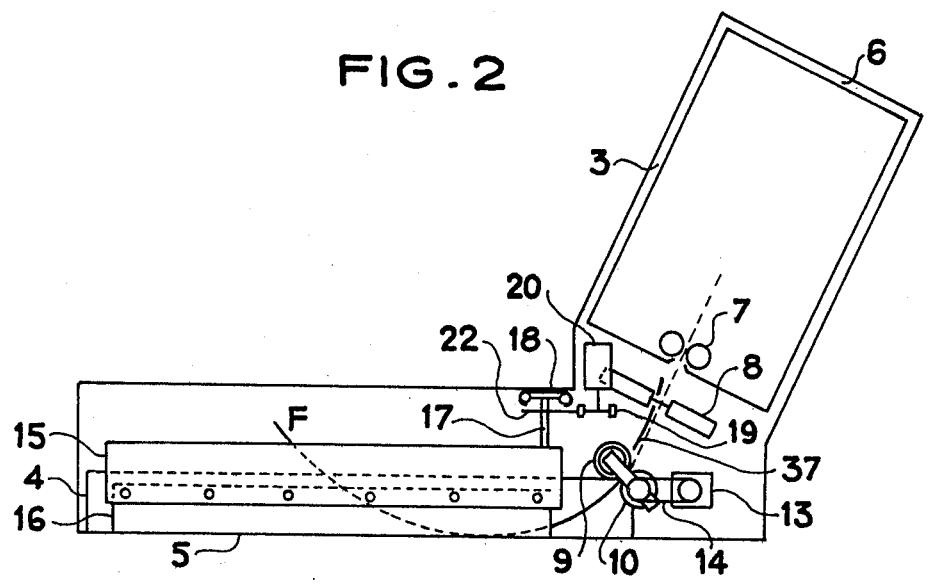
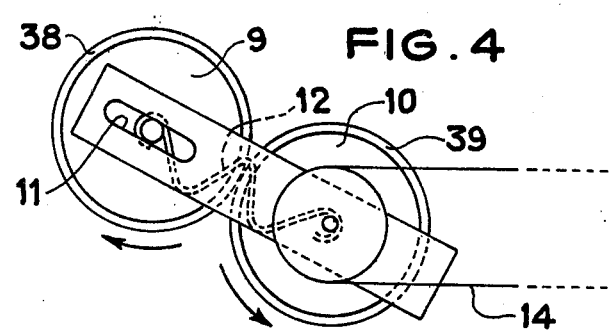
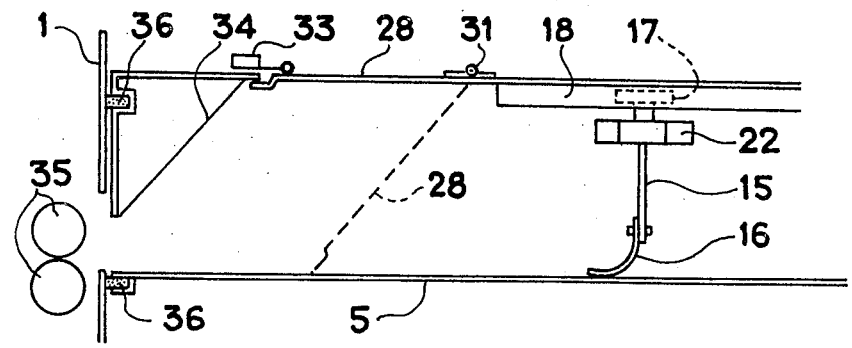

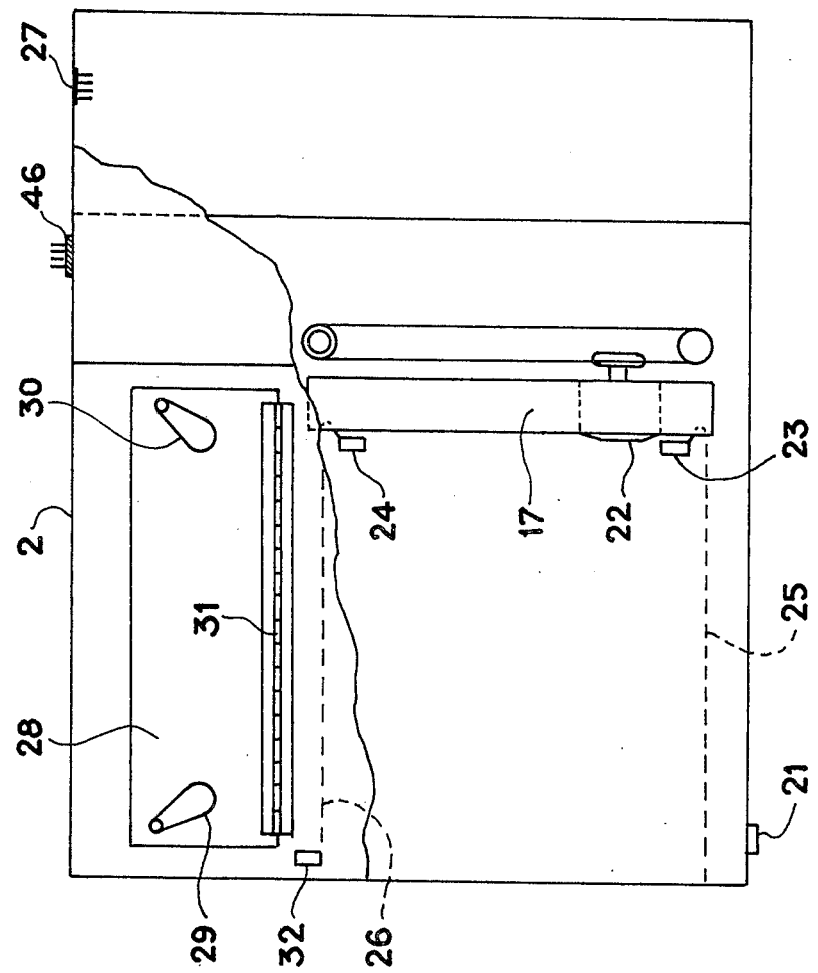

AUTOMATIC FILM TRANSFER DEVICE FOR MAGAZINES CONTAINING FILM IN SHEETS

The present invention relates to a device for the automatic transfer of exposed film sheets or negatives exhibiting a curvature, from an issuing magazine to a developer apparatus. It concerns, in particular, a device which can be rendered light-proof and which, from a motor-driven magazine/containing exposed film sheets having an essentially cylindrical curvature with generatrices perpendicular to the direction of translation of the film coming therefrom, directs and transfers the film ejected from said magazine towards a developer apparatus so that the aforesaid generatrices are rendered parallel to the direction of translation of the film to the developer.

Exposed film sheets of this kind may come from apparatus utilising unexposed film on spools. If such film sheets are introduced into a developer apparatus in such a way that their axis of curvature is parallel to the axes of the guide and drive rollers located inside the developer apparatus then, because of this curvature, a sheet may escape between two consecutive rollers and thus cause a break-down of the developer apparatus. By imparting to the film sheet a rotation through 90° about an axis substantially perpendicular to the film sheet in order that the leading edge presented to the developer apparatus is one of the two curved edges, this leading edge is straightened out by the first pair of drive rollers of the apparatus so that the negative no longer tends to follow the curvature of the ensuing rollers, and the aforesaid drawback is avoided. This operation, hitherto a manual one, can be performed mechanically if it is possible to automatically extract the exposed film sheets or negatives for development, from the magazine containing them, as is the case with the magazine described in U.S. Pat. No. 3,743,200 filed July 29, 1971, in the name of the present applicant.

The transfer device forming the subject of the present invention, avoids the need for any manipulation and presents to the entry of the developer apparatus the correct edge, as hereinbefore defined, of the negative leaving this kind of magazine. The curved negatives leave the magazine with their generatrices perpendicular to the exit direction and are subsequently directed perpendicularly to their exit direction, that is to say in parallel to their own generatrices, towards the developer apparatus.

According to the invention there is provided a device for the automatic transfer of film sheets from a motorized magazine wherein they are stored by winding around a cylindrical shaft so that they present ejected therefrom an approximately cylindrical curvature extending lengthwise, to an automatic developer apparatus having an elongated input slot; said device comprising: a light-tight housing including: a box-shaped portion for receiving said film elements ejected lengthwise, one by one, from said magazine and entering said portion at one side thereof, said portion having at its rear end an elongated output slot for registering light-tightly with said input slot of said developer apparatus and including motor-driven means for pushing said film sheets when located therein in a transverse direction towards said output slot, the inner surface of said portion gradually narrowing down in the vicinity of said output slot so as to flatten said curved film sheets to facilitate their introduction into the input slot of said developer apparatus.

The invention will be better understood and other of its features and advantages will become apparent from the following description of a preferred embodiment thereof and the accompanying drawings relating thereto, in which:

FIG. 1 is a perspective view of a device according to the invention;

FIG. 2 is an elevational sectional view of the preferred embodiment;

FIG. 3 is a plan view of same;

FIG. 4 is a detailed view of FIG. 2;

FIG. 5 is a lateral sectional view of the preferred embodiment; and

Figure 6:
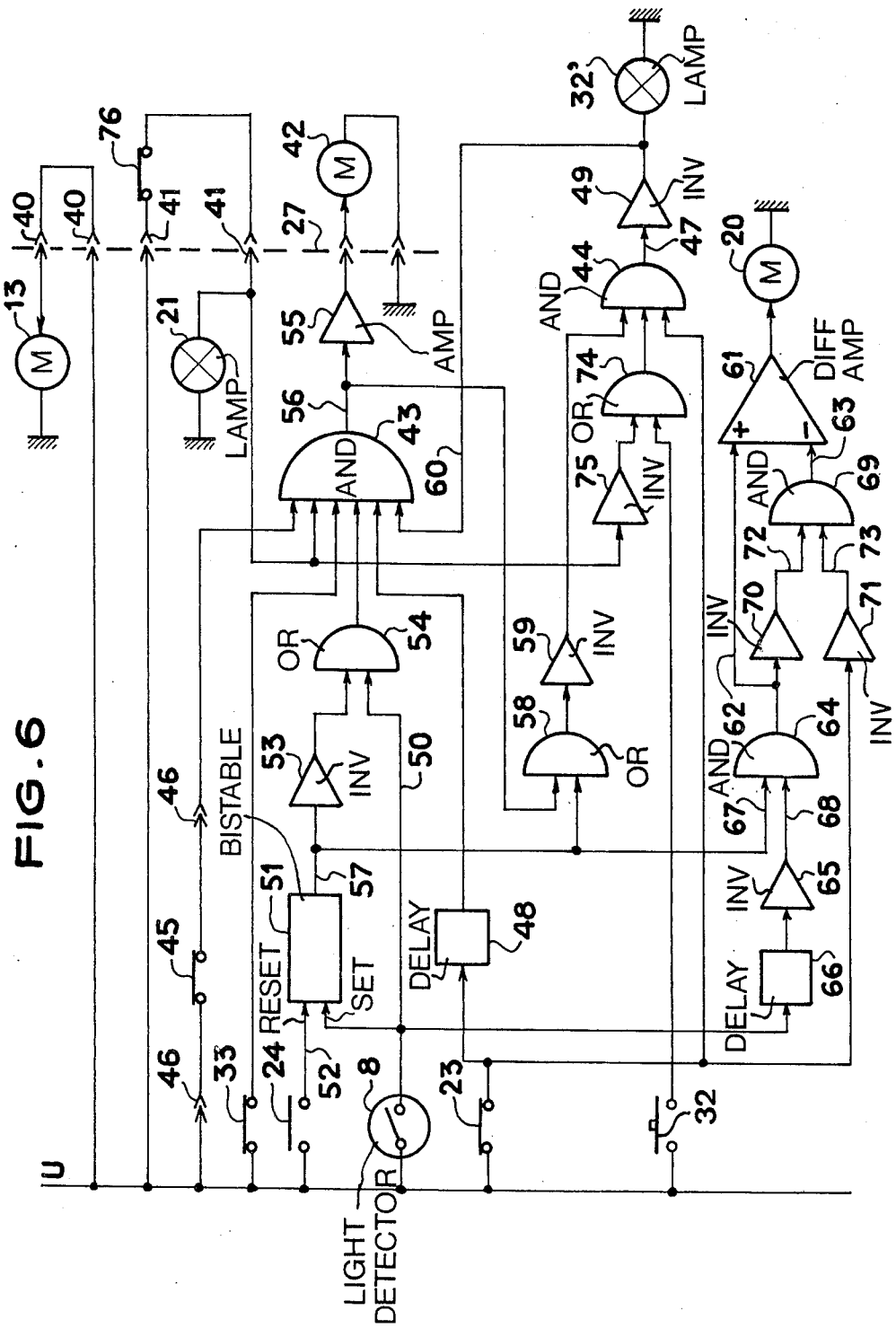
FIG. 6 is a schematic diagram showing the electronic control circuit of the assembly.

FIG. 1 shows a developer apparatus 1 associated with a hollow box-shaped housing 2 of the transfer device according to the invention, this housing 2 being arranged with its output slot 4 adjacent the entry slot of the developer 1. This housing 2 comprises a portion or compartment provided for carrying a magazine containing the exposed negatives, for instance of the type described in the applicant's aforementioned U.S. Patent this portion being provided with a frontal opening 3 for inserting the magazine therein.

More precisely, the housing 2 includes two box-shaped portions or compartments, the first one of which includes the means for inserting the film sheets one by one into the entry slot of the developer 1 and a rear output slot 4 for registering with the above-mentioned entry slot. This portion, called transfer portion, has a width which is larger than the length of the film sheets stored in the magazine and at least as large as the entry slot of the developer so as to light-tightly cover it. The second portion of housing 2 is provided for lodging the magazine inserted therein through the frontal opening 3 and is light-tightly and integrally connected to the first portion at one side thereof. It may be inclined with respect to the latter, as shown in FIG. 1, so as to reduce the overall width of the transfer device and/or to facilitate the ejection from the magazine to the first portion by gravity.

The housing 2 is to be detachably mounted on the developer 1 by a supporting system, not shown, which is independent of the latter, for carrying it at such a height that the bottom plate 5 is at the same level as the film plane determined by the pair of intake rollers 35 located inside the developer apparatus 1 behind its entry slot. A signalling lamp 21 emitting non-actinic light is arranged at the front of the housing 2 and remains lit throughout the whole of the cycle of unloading of the magazine, it is turned off only when the latter is empty.

In FIG. 2, the film sheet leaving the magazine 6, which has been introduced into the second portion of the housing 2 through the opening 3, is ejected by exit rollers 7 from the magazine through an aperture neighboring these rollers 7, guided lengthwise by a deflector plate 37 and passes through the field of a film-presence detector 8 made up for example by a source of non-actinic radiation (infra red) and an appropriate radiation detector respectively arranged at either side of the film path. The film sheet is then picked up between a pair of contiguous drive rollers 9 and 10 having rubber liners 38 and 39 (see FIG. 4), the shaft of one of these 9 being lodged in a pair of lateral elongated slots 11 and being coupled to the shaft of the other one 10 which has a fixed location by means of a pair of springs 12 adjacent to the slots 11. The fixed-shaft roller 10 is driven by a small d.c. motor and reduction gear set 13 and a chain 14. When leaving the rollers 9 and 10, the film sheet slides along the top surface of te bottom plate 5 of the first portion. Its curvature is directed upwards in position F. Pushing means including a movable rectangular elongated flat plate 15, for example, is provided inside the first portion for translating the film sheet sidewise towards the developer apparatus 1. Attached to this plate 15 at its bottom side, there is a semi rigid band of plastics material 16 which is curved towards the output slot 4 and rubbing plate the top of the bottom plate 5 (see FIG. 5). The pushing means 15 and 16 is attached to a slide-block 17, sliding in a straight slideway 18 (guiderails) and driven by a chain 19 from a motor and reduction gear set 20.

FIG. 3 shows the electric stops of the mobile assembly 17, the latter being provided at one of its edges with a boss 22 which acts as a switching cam relatively to two micro-switch contact breakers 23 and 24, the first defining the maximum forward position 25 of the pushing means, and the other its maximum rearward position. On the sidewall of the second portion containing the magazine 6 located opposite the opening 3, there is a male multipin electrical connector 27 of the plug-in kind, which cooperates with the corresponding female connector of the magazine in order to feed and control the drive system thereof and, in return to indicate the presence of film or the emptiness of the magazine by means of an analogue voltage, for example. The top of the first portion of housing 2, close to the output slot, is provided with a hatch 28, which, by the release of a pair of latching means 29 and 30, can be made to pivot about a hinge 31 in order to rest upon the top face of the bottom plate 5 as indicated by the dashed line in FIG. 5. The utility of this hatch will be indicated hereinafter while describing the operation of the apparatus. A push-button 32 of the "push-push" type includes a lamp for emitting non-actinic light, which remains lit during the unloading of the magazine. This push-button 32 when operated, turns the lamp off and controls the unlatching of the hatch 28.

FIG. 5 furthermore illustrates a safety micro-switch contact breaker 33, which signals that the hatch 28 is properly closed. An inclined deflector plate 34 straightens the film sheets in order to guide them towards the input drive rollers 35 of the developer apparatus 1. A felt lining 36 surrounding the output opening 4 ensures the light-tightness of the transition between the housing 2 and the developer apparatus 1.

In FIG. 6, a partial schematic diagram of an embodiment of the transfer device's control circuit has been shown. The circuit of FIG. 6 utilises data furnished by the detector 8, the contacts 23, 24, 32 and 33 arranged in or upon the transfer device, and the data indicating presence of the magazine, through a pair of pins 40 of the connector 27, as well as data indicating that the magazine is not empty by the closure of a contact 76 through a pair of pins 41 of this same connector 27 and also data indicating non-saturation of the developer apparatus 1 by means of a contact 45 provided in the developer 1 and connected to the circuit through the pair of pins 46, in order to respectively control the starting or stopping of motor 13 driving the rollers 9 and 10 of motor 42 located inside the magazine, of motor 20 driving the pushing means 15 and also the lighting up or turning off of the signalling lamps 21 and 32.

This transfer device control circuit comprises primarily a differential amplifier 61 and two AND-gates 43 and 44 having respectively 6 and 3 inputs, the first one 43 controls the operation of the motor 42 of the magazine, and the second one 44 controls the operation of the lamp 32' contained in pushbuttom 32, which controls the operation of the hatch 28 of FIGS. 3 and 5, as will be explained hereinafter.

The six AND-gate 43 inputs are respectively fed through the pins 46 and 41, by the contact 33 which indicates closure of the hatch 28, by the light detector 8 indicating the presence of film between the magazine 6 and drive rollers 9 and 10, by the contact 23 corresponding to the maximum forward position of the pushing means 15, through a delay circuit 48, and by the output 47 of the gate 44 through an inverter 49. The data coming from the light-detector 8 is fed, on the one hand, to a first input 50 of an OR-gate 54 and on the other hand to the set input of a bistable storage stage 51. This bistable stage 51 is feeding an inverter stage 53, whose output feeds the second input of the OR-gate 54. The OR-gate 54 has an output feeding the AND-gate 43 and passes any voltage other than zero, whether it comes from the bistable stage 51 via the inverter stage 53 or directly from the detector 8. When a voltage U is supplied by the detector 8 to the set input of the bistable stage 51, the same voltage U appears at its output 57 and persists even if the voltage U coming from the detector 8 disappears, the resetting to zero of the bistable stage 51 output being triggered through an input 52 when the end of travel contact 24 closes. If a voltage U appears at the same time at all the input terminals of the gate 43, the latter provides at its output 56 a control signal to a power amplifier 55 which starts the motor 42 of the magazine in order to eject a film sheet.

The AND-gate 44 has one input fed from the contact 23 already referred to, another input from the output of an OR-gate 74 with two inputs, whose first input is fed by push button 32 and whose second input is fed by the contact 76 of the magazine via the pins 41 and a further inverter stage 75. The third input of AND-gate 44 is fed by the output 56 of the AND-gate 43 and by the output 57 of the bistable stage 51 combined in an OR-gate 58 which is followed by another inverter stage 59. If a voltage U is present simultaneously at the three inputs of the AND-gate 44, its output 47 delivers the same voltage U to an inverter stage 49, which, on the one hand, controls the signalling lamp 32' of the pushbutton 32 and, on the other hand, feeds input 60 of AND-gate 43.

The differential amplifier 61 controls the motor 20 driving the sliding block 17. Depending upon whether the differential amplifier is supplied with a voltage U at non-inverting input 62 or at inverting input 63 (the other input being at zero potential) the motor 20 will rotate in one or the other direction and the slide block 17 carrying the pushing means 15 and 16 will move either forwards or backwards. For example, if the input 62 is actuated, the input 63 being at zero voltage, the pushing means 15 will move from position 25 to position 26. The control signal fed to the input 62 comes from an AND-gate 64 with two inputs 67 and 68, the first of which is fed by the output 57 of the bistable stage 51 and the other, via an inverter stage 65 and delay circuit 66, from the film presence detector 8. The second input 63 of the differential amplifier 61 is fed from an AND-gate 69 with two inputs 72 and 73, the former one receiving the same signal input 62 via an inverting stage 70, and the latter one is fed by the contact 23 via a further inverter 71. For example, the detector 8 has to be conducting, i.e., there should no more film between it and the light source, for a voltage U to appear at the output 68 of the reversing switch 65. If furthermore, the bistable stage 51 is not reset to zero, there will be a voltage U at the input 67 and the AND-gate 64 will deliver a non-zero voltage U to bothethe inputs 62 of the amplifier 61 and of the inverter 70. The inverter 70 delivers a zero voltage to the input 72 and, consequently, AND-gate 69 feeds a zero voltage to input 63. The amplifier 61 being fed by the non-inverting input 62 delivers a control voltage to the motor 20 with a positive polarity, so that the pushing means 15 will driven towards position 26 of FIG. 3.

The operation of the transfer device shown in FIGS. 1 2, 3, 4, and 5, is as follows;

The transfer device housing 2, equipped with a magazine 6, being totally light-proof, may be placed in daylight. The insertion of the connector 27 into the corresponding connector of the magazine, which we will assume not to be empty, applies voltage to the lamp 21 which lights up and also to the electric motor 13, which drives the rollers 9 and 10 in opposite directions of rotation, in a manner indicated in FIG. 4. The motor 13 rotates during all the time while the connector 27 is connected to the magazine. When the developer apparatus 1 authorizes the introduction of a film, the hatch 28 being closed, the magazine not being empty and the pushing blade 15 being in the forward position 25 thus clearing the surface of the plate 5, the contacts 45, 33, 76 and 23 are respectively closed and apply a voltage U to the four corresponding inputs of the AND-gate 43 and to the input of the inverter 75. No manual intervention being required, the push-button 32 remains in the open position, which results in a zero voltage at the corresponding input of the OR-gate 74. As the inverter 75 also delivers a zero voltage, both inputs of the 74 being at zero potential, there is zero potential at its output. Thus the AND-gate 44 is blocked while the inverter 49, delivers a voltage U to the signalling lamp 32′ and to the input 60 of the AND-gate 43. As long as the push-button contact 32 is not closed, or as long as the magazine is not empty (opening contact 76), the lamp 32′ remains lit and the input 60 remains at a non-zero voltage. Assuming that there is no film present in the transfer device 2, the contact of the detector 8 is open; the voltage at the output 57 of the bistable stage 51 being zero, the inverter 53 via the OR-gate 54 delivers a voltage U to the AND-gate 43. This gate 43 thus has its six inputs activated and the motor 42 of the magazine 6 is started.

The zero voltage existing at the output 57 of the bistable latch 51, results in a zero voltage at non-inverting input 62, and the fact that the contactor 23 is closed activates the inverter 71 creating a zero voltage at one of the inputs of the gate 69 and hence, a zero voltage at the inverting input 63. The two inputs 62 and 63 of the amplifier 61 being at the same potential, the motor 20 driving the pushing means 15 remains stationary. The film sheet ejected from the magazine 6 is curving upwards when leaving the roller 7 and is being guided by the deflector 37 towards the roller 9 and 10 which are initially forced into contact with one another by the springs 12. The film intersects the light path between the source and the detector 8. The detector 8 delivering a voltage U to the set input although of bistable latch 51, whose output delivers a voltage U to the inverter 53, whose output delivers in response thereto a zero voltage. Thus output of the OR-gate 54 remains unchanged while the film sheet passes in front of the detector 8. The effect to the inputs 67 and 68 of the gate 64 is similar, the delay circuit 66 being arranged to operate only for a negative-going voltage transient at its input.

The speed of rotation of the low-power motor 13 is such, that if it were to draw the film alone by means of the rollers 9 and 10, the speed of translation of the film sheet would be slightly higher than that which it has at exit from the rollers 7. Thus, this motor 13 first of all draws the film sheet from the magazine and then pushes it on to the plate 5 when its end clears the rollers 7. The assembly of rollers 9 and 10 is located in such a way that it is spaced from the top of the bottom plate 5 by a distance smaller than the minimum radius of curvature of the film sheet. Thus, the film sheet has its center of curvature above the top wall of the first portion of the housing a; consequently it is impossible for the film to fold back on itself. The rollers 9 and 10 are lined with rubber or other resilient matter 38 and 39, so that slipping is prevented by means of the springs 12 which maintain contact pressure between the two rollers and the film and, should the film present a resistance to traction, the speed of the motor 13 decreases. When the light path of the detector 8 is re-established, the film having left this zone, the contact 8 breaks and, the output of the inverter 53 already being at zero potential, zero voltage appears at the output of OR-gate 54 and, consequently, at one input of the gate 43 causing the motor 42 of the magazine 6 to stop. Simultaneously a voltage U is applied through the inverter 65 to the input 68 of the gate 64, whilst its input 67 being already at non-zero voltage U from inverter 66. The signal thus applied by the gate 64 to the input 62 of the amplifier 61 causes the motor 20 to rotate moving the pushing blade 15 from its frontal position 26 towards the rear; this happens only after a delay from the delay circuit 66, the length of this delay being such that the starting of the motor 20 occurs after the entire film sheet has left the space between the rollers 9 and 10. The inverter 70 fed by AND-gate 64 will deliver a zero voltage to the input 72 of the AND-gate 69, whilst the opening of the contact 23, due to displacement of the pushing means 15, causes a voltage U to appear at its input 73. The AND-gate 69 will thus deliver to the input 63 of amplifier 61 a zero voltage so that the direction of rotation of the motor 20 remains the same.

The film sheet is pushed laterally by the pushing blade 15 towards the deflector 34 which flattens it by reducing the curvature so that it can be taken between and driven by the input pair of rollers 35 of the developer apparatus 1. The speed of transfer of the element 15 being less than the speed of intake of the rollers 35, the film sheet ceases to be pushed by the element 15 and will thereafter be pulled by the rollers 35. This allows to make the distance between the rollers 35 and the maximum rearward position 26 much smaller than the film width which is constant. The flexible part 16 carried by the pushing means 15 wipes over the top surface 5 in order to drive films which are too flat and which consequently may escape between the rigid part of the element 15 and the surface 5.

When the film enters the developer apparatus, the contact 45 opens and delivers a zero voltage to the corresponding input of the AND-gate 43. Another input of the AND-gate 43 is fed a zero voltage already by the gate 54 and the opening of contact 24 through OR-gate 54. When the assembly 15 arrives in the rearward position 26, the contact 24 closes triggering the resetting of bistable latch 51 so that its output 57 delivers a zero voltage. Consequently, the inverter 53 delivers a non-zero voltage U to the corresponding input of the OR-gate 54 which, in turn, feeds this voltage U to one input of the gate 43.

Simultaneously a zero voltage appearing at the input 67 of the AND-gate 64, which, in turn, feeds a zero voltage to the non-inverting input 62 of the amplifier 61, causing the motor 20 to halt. The zero voltage applied by AND-gate 64 to the inverter 70, makes the latter deliver a non-zero voltage U to the input 72 of the AND-gate 69, whose other input 73 is fed a non-zero voltage U from the inverter 71, which is controlled by the contact 23 (maximum forward position). The input 63 of the amplifier 61 thus receives a non-zero voltage U (the other one 62 being at zero voltage) and controls the reverse displacement of the pushing system 15 towards the maximum forward position 25 where the contact 23 closes restoring to zero the voltage of the input 63, so that the motor 20 stops. When the pushing means 15 leaves the maximum rearward position, the opening of contact 24 makes the reset input of the bistable latch 51 return to zero. The closing of the contact 23 causes the appearance of a voltage U at the corresponding input of the AND-gate 43 via the delay circuit 48. After the closing of the contact 45, indicating that the developer apparatus is ready to receive another film, the electrical state of the circuit is identical to that which it had at the start. The cycle continues automatically until the contact 76 indicating the emptiness of the magazine opens. The opening of contact 76 turns the lamp 21 off and blocks the AND-gate 43 which stops the motor 42 of the magazine. The empty magazine can then be replaced by a full one.

The foregoing mode of operation corresponds to utilisation in a lit room. In this case, the push-button 32 and the hatch 28 are not used, the first one can remain disconnected and the second one permanently latched.

Another advantage of the device is that, when operated in a dark room, it is possible to introduce X-ray films sheets or photographic reels respectively coming from casettes, from magazines with manual extraction or cameras, into the developer apparatus manually, without dismantling said apparatus. In this kind of application, it is necessary to wait until the magazine is unloaded, that is to say for the lamps 21 and 32' to be turned off simultaneously.

When the urgency of manual development takes precedence over automatic development which is in progress, then the push-button 32 must be pressed and the locking of the hatch 28 is authorised as soon as the lamp 32' is turned off. In other words, the hatch 28 cannot be opened without eventual damage, until the end of a current cycle. Under these conditions, it is necessary for the magazine motor 42 to be stopped (output 56 of AND-gate 43 at zero voltage) and for the output 57 of the bistable latch 51 to be at zero potential, these two data being fed to OR-gate 58 and therefrom to the inverter 59. Furthermore, it is necessary that the pushing means 15 should be in its forward end position 25 and that therefore the contact 23 should have been established. In this case, when push-button 32 is in the make position, the three inputs of the gate 44 are activated and, by the action of the inverter stage 49, the lamp 32' is turned off and the AND-gate 43 becomes blocked before the information coming from the contact 23, delayed slightly by the delay circuit 48, is able to trigger a fresh cycle.

The operation of the handles 29 and 30 releases the hatch 28, one edge of which drops onto the top of the bottom plate 5 of the housing 2. The distance between the two handles being greater than the largest dimension of the largest film format to be handled, it is a simple matter to introduce any sensitised surfaces into the developer apparatus through the passage left clear between the hatch 28 and the deflector 34, as FIG. 4 shows. At the end of manual development, the closing of the hatch is monitored by the microswitch contact 33. All the inputs of the gate 43 are activated, except the input 60; it is merely necessary to operate the push-button 32 again by returning it to its initial position, in order to block the gate 44, cause the lamp 32' to light up again, and simultaneously deliver a voltage U the input 60 of the gate 43. The electrical and mechanical state of the device authorises continuation of automatic transfer cycles.

What is claimed is:

1. A device for the automatic transfer of sheets of exposed film from a magazine having an elongated aperture for letting said sheets pass therethrough, wherefrom said sheets ejected present an approximately cylindrical residual curvature extending lengthwise, to an automatic developer apparatus having an elongated input slot for admitting said sheets thereto; said device comprising a light-tight housing including a hollow box-shaped transfer portion for receiving said sheets ejected lengthwise, one by one, from said magazine and entering said transfer portion at one side thereof, and having at its rear end an elongated output slot for communicating and registering light-tightly with said input slot of said apparatus; said transfer portion further including means for pushing said sheets, when one thereof is entirely located therein, sidewise towards said output slot, comprising: a reciprocatingly movable pushing plate substantially covering the inner cross-section of said transfer portion perpendicularly to the direction of its reciprocating motion towards and away from said output slot and having a lower edge portion substantially contiguous with the top face of the bottom wall of said transfer portion, and a drive mechanism including a first electric motor for imparting to said pushing plate said reciprocating motion between an utmost forward position, wherein said pushing plate is clear of said transfer section for the introduction of a film sheet therein, and an utmost rearward position, wherefor an edge of said film sheet enters into said developer apparatus input slot, the inner height of said transfer portion, beyond the utmost rearward position of said plate, gradually diminishing towards said output slot so as to flatten out said curved film sheets to facilitate their introduction into the input slot of said developer apparatus.

2. Device as claimed in claim 1, wherein said housing further comprises a further portion for holding said magazine and for said magazine aperture to light-tightly communicate with one side of said transfer portion.

3. Device as claimed in claim 1, wherein said transfer portion includes a mechanism for extracting said film sheets from said magazine located between said pushing means and said magazine, said extracting mechanism comprising: a pair of rollers respectively covered by elastic linings bearing resiliently against one another for taking said film sheets ejected from said magazine between them, said rollers being driven by a second electric motor for placing said film sheets in front of said pushing means; and means for detecting the presence of film located between said magazine and said pair of rollers.

4. Device as claimed in claim 1, further comprising: first electrical connector means for connection with said magazine, second electrical connector means for connection with said developer apparatus; said connector means respectively delivering supply voltages and signals controlling the operation of the motorized magazine and for receiving therefrom signals respectively indicating whether said magazine contains further film sheets and whether said developer is capable of receiving another film sheet; and an electrical control circuit connected to both connecting means for coordinatedly controlling the operation of said magazine, said pushing means and said developer apparatus.

5. Device as claimed in claim 4, further comprising: a hatch for light-tightly covering an opening located on the upper wall of said box-shaped former portion in the vicinity of said output slot, when closed, and for directly introducing film sheets through said opening and output slot into said input slot of said developer apparatus when opened.

6. Device as claimed in claim 5, wherein said electrical control circuit includes manual control means for stopping the unloading of said magazine and the transfer of said film when said pushing means is in a position corresponding to the beginning of a transfer cycle, to enable direct insertion of film sheets into the developer apparatus while stopping the drive of said magazine and said pushing means and for enabling the latching of said hatch in order to resume the unloading of said magazine.

7. Device as claimed in claim 1, wherein said pushing plate comprises a rigid upper plate-shaped portion and a lower portion made up from a sheet of flexible semi-rigid material fixed to the lower edge of said upper portion and having a free length greater than the space between the lower edge of said upper portion and the top face of said bottom wall of said transfer portion, so that said lower flexible portion is curved and bears against said top face during the motion of said pushing plate.

* * * * *